(12) United States Patent
Yang et al.

(10) Patent No.: US 11,837,929 B2
(45) Date of Patent: Dec. 5, 2023

(54) ELECTRIC MACHINE, STATOR ASSEMBLY, AND WINDING ARRANGEMENT PROVIDED THEREON

(71) Applicant: XPT (Nanjing) E-powertrain Technology Co., Ltd., Nanjing (CN)

(72) Inventors: Young Yang, Zhangsha (CN); Lu Bi, Shanghai (CN); Wei Hong, Shanghai (CN)

(73) Assignee: XPT (Nanjing) E-powertrain Technology Co., Ltd., Nanjing (CN)

( * ) Notice: Subject to any disclaimer, the term of this patent is extended or adjusted under 35 U.S.C. 154(b) by 294 days.

(21) Appl. No.: 17/335,107

(22) Filed: Jun. 1, 2021

(65) Prior Publication Data

US 2021/0376680 A1 Dec. 2, 2021

(30) Foreign Application Priority Data

Jun. 2, 2020 (CN) .......................... 202020981332.3

(51) Int. Cl.
*H02K 3/14* (2006.01)
*H02K 3/28* (2006.01)

(52) U.S. Cl.
CPC ................. *H02K 3/28* (2013.01); *H02K 3/14* (2013.01)

(58) Field of Classification Search
CPC .................................... H02K 3/14; H02K 3/28
See application file for complete search history.

(56) References Cited

U.S. PATENT DOCUMENTS

| | | | |
|---|---|---|---|
| 6,424,071 B1 | 7/2002 | Oohashi et al. | |
| 6,894,417 B2 | 5/2005 | Cai et al. | |
| 7,034,428 B2 | 4/2006 | Cai et al. | |
| 7,622,843 B2 | 11/2009 | Cai | |
| 10,326,326 B2 | 6/2019 | Laldin et al. | |
| 2012/0293037 A1* | 11/2012 | Uchida | H02K 3/487 310/214 |

FOREIGN PATENT DOCUMENTS

| | | |
|---|---|---|
| CN | 108347115 A | 7/2018 |
| CN | 207766054 U | 8/2018 |

* cited by examiner

*Primary Examiner* — Ramon M Barrera
(74) *Attorney, Agent, or Firm* — Sheridan Ross P.C.

(57) ABSTRACT

A winding arrangement provided on a stator of an electric machine. The winding arrangement includes at least four windings. A first winding and a second winding occupied a first subset of slots; and a third winding and a fourth winding occupied a second subset of the slots. The first subset and the second subset of the plurality of slots are adjoined to each other. A span between two adjacent slots concerning the first winding, the second winding, the third winding, and the fourth winding is chosen from a full-pitch, a short-pitch, and a long-pitch to result in the winding arrangement where the first subsets in a first half of the slots is diagonal to the second subset in a second half of the slots, and the second subset in the first half of the slots is diagonal to the first subset in the second half of the slots.

24 Claims, 4 Drawing Sheets

ELECTRIC MACHINE, STATOR ASSEMBLY, AND WINDING ARRANGEMENT PROVIDED THEREON

BACKGROUND OF THE INVENTION

1. Field of the Invention

The present disclosure relates to the field of electric machines, and more particularly, to a stator assembly with a continuous wave winding arrangement.

2. Description of the Prior Art

Countries like China and Germany are racing to completely ban the production and sale of vehicles powered by fossil fuels in the near future. Given that, electric vehicles are getting attentions recently because of their tendency of environmental friendliness. Electric motors are the heart of electric vehicles, and those with a higher efficiency and a higher power density is strongly desired.

A conventional electric motor is constituted by a stator and a rotor. When electricity is applied, the interaction between the magnetic fields and electric currents generates force to push electric vehicles forward. The efficiency of an electric motor can be enhanced by increasing the slot fill factor or using flat or rectangular wires.

Chinese patent CN207766054 ('054 patent) discloses a winding structure where each winding only is inserted in certain layers of the slots. Specifically, as shown in the FIG. 5, the first winding is only inserted in the first and the fourth layers of the designated slots, while the second winding merely is inserted the second and the third layers of the designated slots. The unbalanced winding structure leads to unnecessary circulating currents and losses. It also appears that two adjacent legs in the winding can span more than a layer. This will consequently damage the wires and cost the insulation performance.

Chinese patent CN108347115 ('115 patent) demonstrates another example of winding structure which may resolve the issue of circulating currents, but the structure itself is complicated and costly.

SUMMARY OF THE INVENTION

Therefore, an electric machine, a stator assembly, and a winding arrangement are disclosed herein.

In some embodiments, the three-phase electric machine includes a rotor having a plurality pair of poles, and a stator positioned around the rotor and having a plurality of slots with openings around an inner circumference of the stator and face to the rotor. Each of the slots defines an even number of layers. The three-phase electric machine further includes a plurality of conductors wound in the slots to forma plurality of branches per phase. The conductors form a first branch and a second branch. The first branch and the second branch alternatively occupy the layers of a first subset of the slots. The conductors also form a third branch and a third branch. The third branch and the fourth branch alternatively occupy the layers of a second subset of the slots. The first subset and the second subset are adjoined to each other. Positions of the first subset in a first half of the slots are diagonal to positions of the second subset in a second half of the slots, and positions of the second subset in the first half of the slots are diagonal to position of the first subset in the second half of the slots.

In some embodiments, the stator assembly includes a stator having forty-eight slots. Each of the forty-eight slots defines an even number of layers. A winding arrangement is provided on the stator. The winding arrangement includes a first winding set provided for a first phase, a second winding set provided for a second phase, and a third winding set provided for a third phase. The first winding set occupies a first set of the slots, the second winding set occupies a second set of the slots, and the third winding set occupies a third set of the slots. Each of the first winding set, the second winding set, and the third winding set has sixteen slots. The first set, the second set and the third set are adjoined to one another.

In some embodiment, the winding arrangement disclosed herein is provided on a stator having a plurality of slots. The winding arrangement includes a first winding and a second winding occupied a first subset of the plurality of slots. The winding arrangement further includes a third winding and a fourth winding occupied a second subset of the plurality of slots. The first subset and the second subset of the plurality of slots are adjoined to each other. A span between two adjacent slots concerning the first winding, the second winding, the third winding and the fourth winding is selected from a full-pitch, a short-pitch, and a long-pitch to result in the winding arrangement where the first subset in a first half of the slots is diagonal to the second subset in a second half of the slots, and the second subset in the first half of the slots is diagonal to the first subset in the second half of the slots.

These and other objectives of the present invention will no doubt become obvious to those of ordinary skill in the art after reading the following detailed description of the preferred embodiment that is illustrated in the various figures and drawings.

DETAILED DESCRIPTION

The present disclosure may be understood by reference to the following detailed description, taken in conjunction with the figures as described below. When referring to the figures, directions such as up, down, left, right, front or back refer to directions with respect to each figure. Components of the present disclosure may be configured using a plurality of different orientations. Therefore, directional terms of the present disclosure are for illustration only and not for limiting the scope of the present disclosure. It is noted that, for purposes of clarity and being easily understood by the readers, figures of this disclosure may be simplified schematic diagrams that partially illustrate a portion of a structure; certain components within may not be drawn to scale. Figures may also refer to alternative embodiments or change the structural configuration of the disclosure without affecting the scope of the claims. Certain terms are used throughout the description and following claims to refer to particular components. As one skilled in the art will understand, component manufacturers may refer to a component by different names. This document does not intend to distinguish between components that differ in name but not in function. More specifically, components are distinguished based on function and structural variations. In the following description and in the claims, the terms "include", "comprise" and "have" are used in an open-ended fashion, and thus should be interpreted to mean "include, but not limited to . . . ". Furthermore, the term "coupled to" or "connected to" refers to any direct or indirect electrical connection or structural connection. Therefore, when the description refers to a first device being coupled to/connected to a second device, the first device may be directly connected to the second device via an electrical connection or a structural connection; or the first device may be indirectly connected to the second device via an electrical connection or a structural connection. As such, figures and descriptions of the present disclosure are for illustrating instead of limiting the present disclosure.

Figure 1:
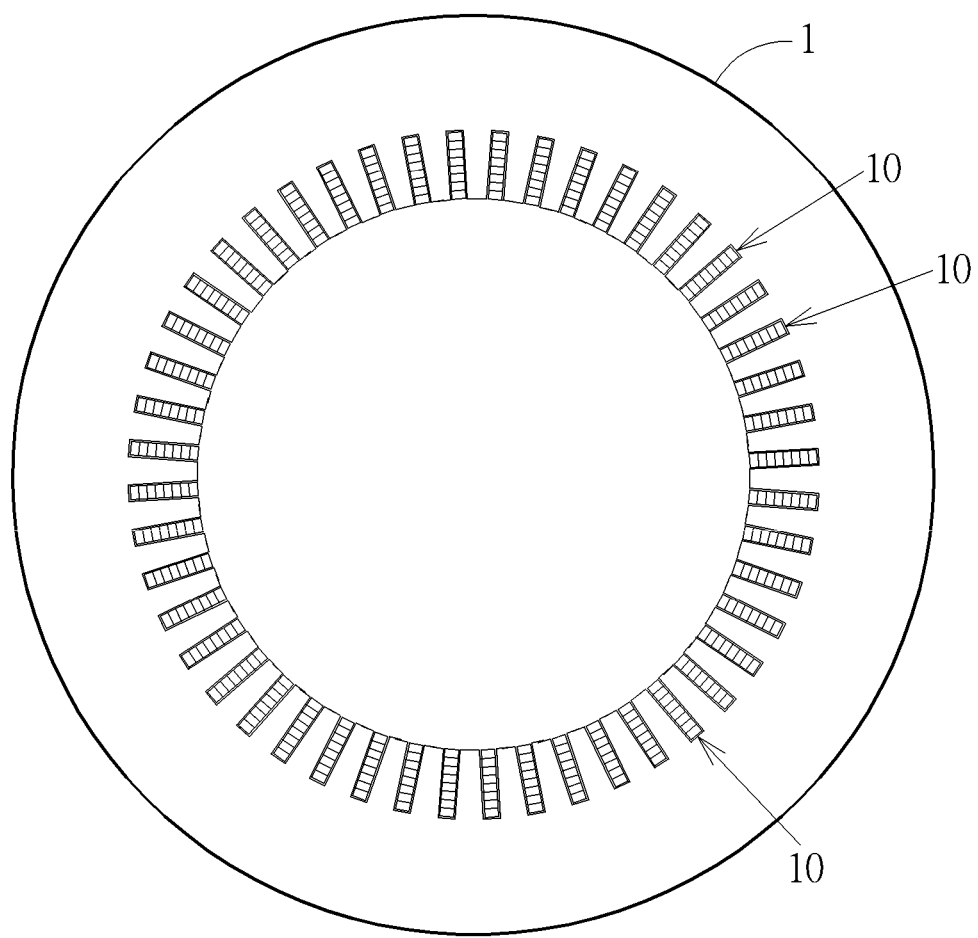
FIG. 1 is a schematic illustration of a stator and stator slots according to an embodiment of the present disclosure.

FIG. 1 is a top view of an exemplary electric machine core, such as a stator 1, which is configured to hold a winding arrangement disclosed herein. It is not illustrated, but, aside from the stator 1, an electric machine also includes a rotor placed concentrically within the stator 1. The present disclosure focuses on the winding arrangement of the stator 1; thus, the operation of the electric machine, which has been well-known by a person of ordinary skill in the art (abbreviated POSITA), will not be discuss in detail in this disclosure.

The stator 1 includes a cylindrically-shaped main body with a plurality of slots 10 formed therein. Each of the slots extends axially and throughout the stator 1. A plurality of conductors are placed in the slots 10 to form a winding arrangement. The stator 1 has an inner circumference 16 and an outer circumference 18. Openings of the slots 10 are provided on the inner circumference 16 and face to a rotor.

Figure 2:
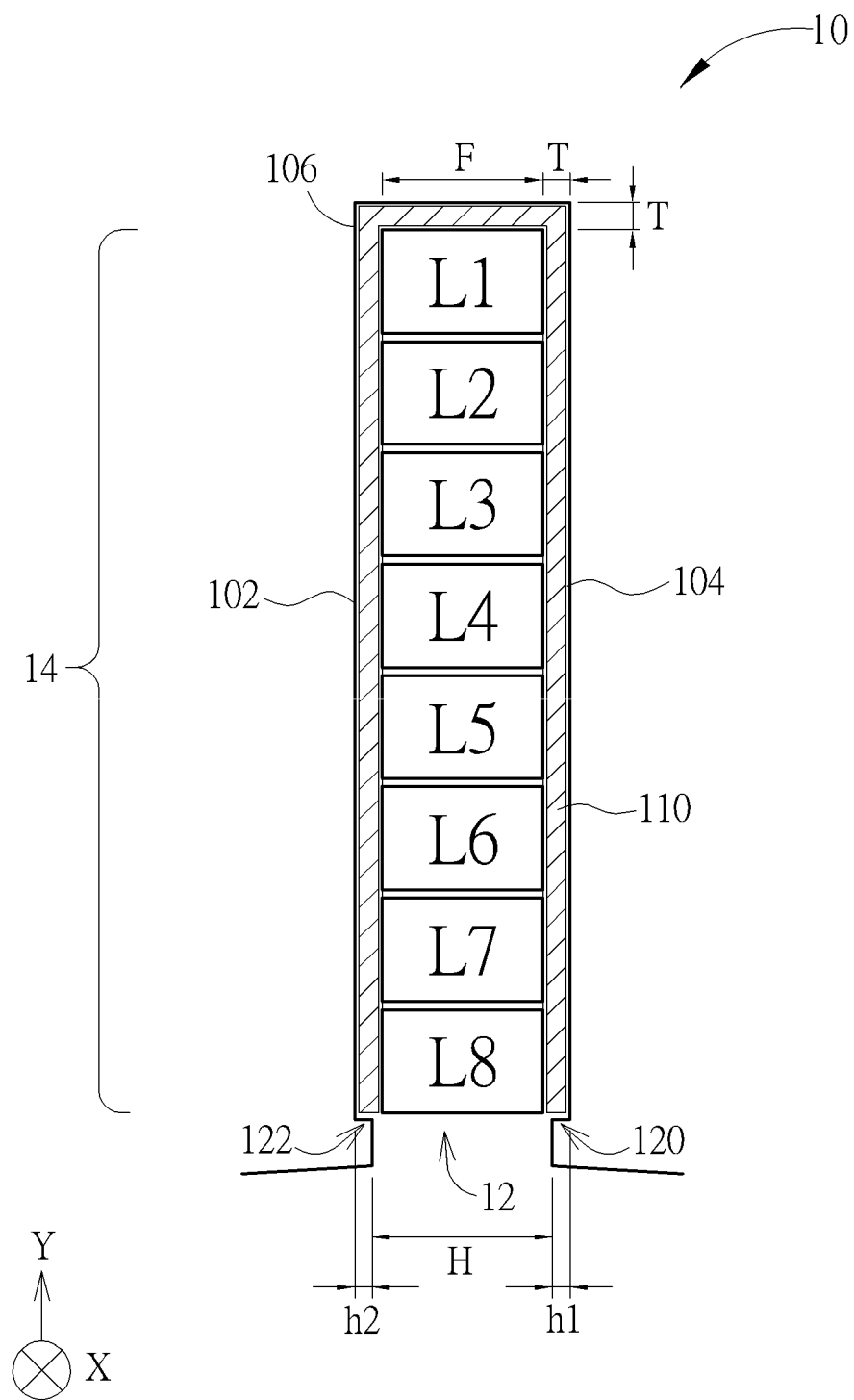
FIG. 2 is a schematic illustration of a stator slot and layers of conductors therein according to an embodiment of the present disclosure.

FIG. 2 is an enlarged cross-sectional view of a slot 10 according to an embodiment of the present disclosure. As illustrated, the slot 10 is structured by a first sidewall 102, a second sidewall 104, a back wall 106 and a slot opening 12. As mentioned, the slot opening 12 is provided on the inner circumference 16 and faces toward a rotor (not shown). The slot 10 also has a first shoe 122 and a second shoe 120 extending from the first sidewall 120 and the second sidewall 104 respectively, and formed at the slot opening 12 side. In one embodiment, a thin layer of insulation 110 is formed against the first sidewall 102, the second sidewall 104, and the back wall 106.

The interior of the slot 10 defines a plurality of layer positions where conductors of the winding arrangement in accordance with the present disclosure are placed subsequently. FIG. 2 depicts an example of eight conductor layers, i.e. L1 to L8, numerically indexed from the back wall side 106 and inward to the slot opening 12, in a slot 10. The conductors in the present disclosure may be achieved by flat or rectangular wires. It should be noted that the eight-layer slot 10 is a mere example, and the number of layers per slot can be varied depending on designs. For the winding arrangement of the present disclosure to work effetely, an even-number of layers is suggested. The reason will be discussed in the later paragraphs. The conductors are wound into the slots 10 of the stator 1 in accordance with winding arrangement described in the following paragraphs to form the stator assembly of the present disclosure.

Exemplarily, as shown in FIG. 2, the width of slot opening 12 is H, the thickness of the insulation 110 is T, the width of the first shoe 122 is h2, while the width of the second shoe 120 is h1. In one embodiment, h1 may or may not be substantially equal to h2. Additionally, both h1 and h2 may be less than T. Assuming a rectangular wire having F in width is adopted. In one embodiment, H satisfied the following condition:

$$(F+0.2 \text{ mm}) < H < (F+2T+0.2 \text{ mm})$$

In one embodiment, the present winding arrangement for a multiphase electric machine includes a plurality of winding sets. Each of the winding sets corresponds to electric currents for a given phase. The winding sets are constituted by a plurality of conductors wave-wound continuously around the slots 10 of the stator 1. The wound conductors form branches of the electric machine. A desired loop can be formed by welding the branches in accordance with designs. In one embodiment, a conductor of the present disclosure includes at least three segments—the lead, the path, and the end. The lead segment inserts into one of the slots 10, the path segment follows the lead segment and passes through numbers of slots 10, while the end segment follows the path segment and inserts to another one of the slots 10. As mentioned, a desire loop by welding selected lead segments and selected end segments of branches.

It is well-accepted by a POSITA that a pole pitch is the distance between two adjacent poles. For an electric machine having a stator with S slots and a rotor with P pole-pair, the pole pitch D is calculated by S/(2*P).

In the present disclosure, the distance of two adjacent conductor segments (i.e. the coil span) in the same branch can be: 1) a full-pitch, 2) a short-pitch, and 3) a long-pitch. In the example of a three-phase electric machine where the stator 1 has forty-eight (48) slots and the rotor is of four-pair poles, the pole pitch, the full-pitch, the short-pitch and the long-pitch are as follows:

Pole Pitch $D=48 \text{ slots}/(2*4 \text{ poles})=6$;

Full Pitch $B=D=6$;

Short Pitch $A=B-1=5$;

Long Pitch $C=B+1=7$.

Additionally, the slots corresponds to a pole taken by one phase are determined by the number of slots per pole per phase (q). It has also been accepted that the number of slots per pole per phase (q) is equal to the total number of slots (S) divided by the number of poles (P*2), and then divided by the number of phases:

$$q=(S/(P*2))/\text{Number of Phases}.$$

Following the example above, the number of slots per pole per phase (q) is: $q=(48/(4*2))/3=2$.

Figure 3:
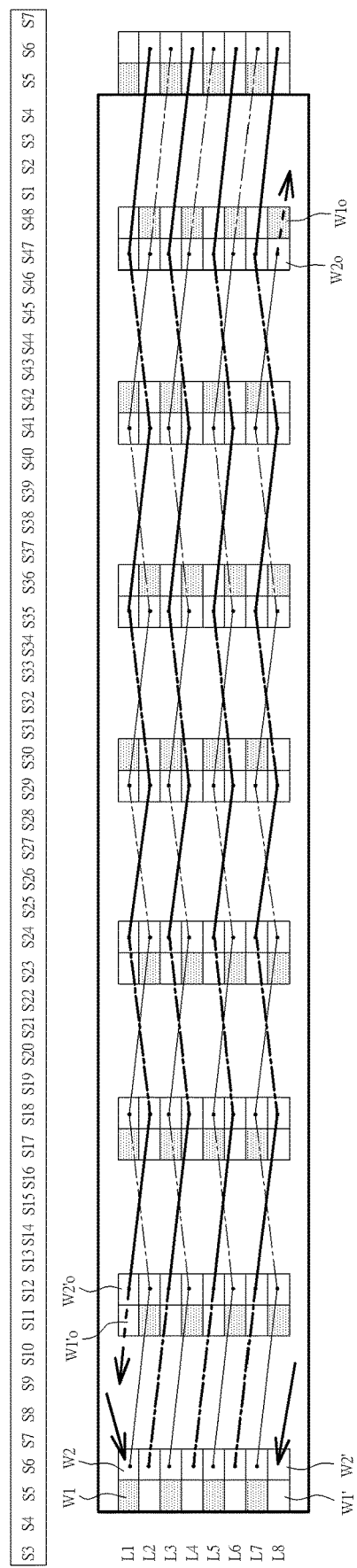
FIG. 3 is a schematic illustration of winding arrangement for four branches of the U-phase.
Figure 4:
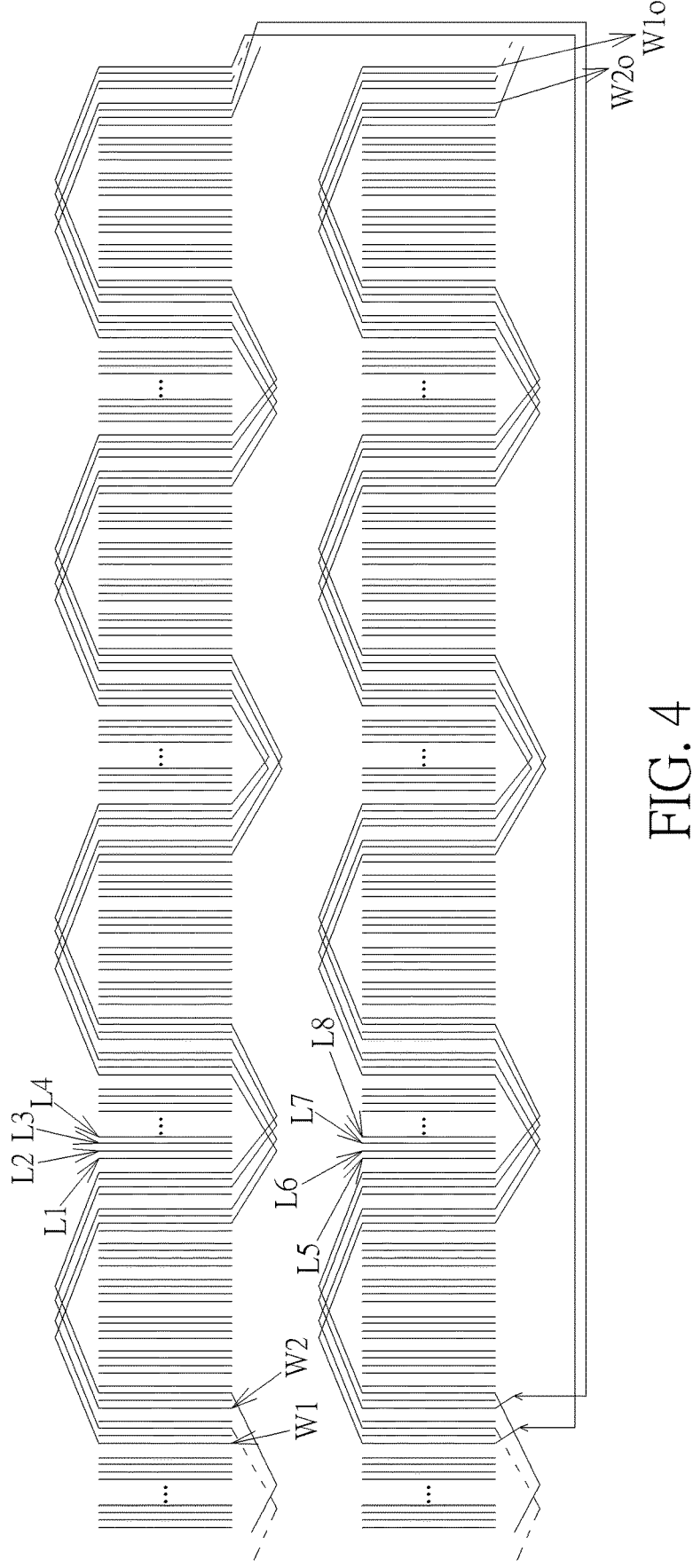
FIG. 4 is a schematic illustration of continuous-wave winding patterns of two branches of the U-phase according to an embodiment of the present disclosure.

Based on the parameters, another example of the wining arrangement for the same three-phase electric machine described above and has four branches per phase in accordance with the present disclosure is depicted in FIG. 3 and FIG. 4.

FIG. 3 illustrates the winding set of the U-phase of the three-phase electric machine of the present disclosure. The four branches are respectively marked as W1, W2, W1' and W2' in FIG. 3. Conceptually, each of the slots 10 is assigned a numeric index for the sake of discussion. The first slot may be any slot 10 in the stator 1; once has been decided, the numbers sequentially assigned to the rest slots 10 clockwise or counterclockwise around the inner circumference of the stator 1 depending on the design. Specifically, the second slot can be either right or left next to the first slot. In the following paragraphs, the numerical index for a given slot 10 is referred by S[index], while the numerical index for a given layer is referred by L [index], and, S[i]L[j] refers to the j-th layer of the I-th slot, for easy understanding.

In view of that, as shown in FIG. 3, the winding of W2 branch begins at L1 of S6, S6L1 (i.e. the lead segment marked as W2 in FIG. 3), and ends up in the L8 of the S47 slot, S47L8 (i.e. the end segment marked as W2o in FIG. 3). The entire winding pattern of W2 branch is described as follows:

S6L1 - S12L2 - S18L1 - S24L2 - S29L1 - S35L2 - S41L1 - S47L2 -
S6L3 - S12L4 - S18L3 - S24L4 - S29L3 - S35L4 - S41L3 - S47L4 -
S6L5 - S12L6 - S18L5 - S24L6 - S29L5 - S35L6 - S41L5 - S47L6 -
S6L7 - S12L8 - S18L7 - S24L8 - S29L7 - S35L8 - S41L7 - S47L8

As can been seen, the coil span between two adjacent conductor segments in W2 branch is either of 1) the short-pitch, i.e. 5 slots, 2) the full-pitch, i.e. 6 slots, or 3) the long-pitch, i.e. 7 slots. For instance, the span between the conductor segments from S24 to S29 is 5 slots, the span between the conductor segments from S29 to S35 is 6 slots, while the span between the conductor segments from S47 to S6 is 7 slots. The reason behind the selection of the spans will be discussed in the later paragraphs. Additionally, as can been observed, in accordance with the present disclosure, the span in terms of layer between two adjacent conductor segments is restrained to one layer.

As also shown in FIG. 3, the winding of W2' branch starts at the L8 of the S6, S6L8 (i.e. the lead segment marked as W2'), and ends up in the L1 of the S12 slot, S12L1 (i.e. the end segment marked as W2'o). The entire winding pattern of W2' branch is as follows:

S6L8 - S47L7 - S41L8 - S35L7 - S29L8 - S24L7 - S18L8 - S12L7 -
S6L6 - S47L5 - S41L6 - S35L5 - S29L6 - S24L5 - S18L6 - S12L5 -
S6L4 - S47L3 - S41L4 - S35L3 - S29L4 - S24L3 - S18L4 - S12L3 -
S6L2 - S47L1 - S41L2 - S35L1 - S29L2 - S24L1 - S18L2 - S12L1

Similarly, as can be observed, the coil span between two adjacent conductor segments of W2' branch is either of: 1) the short-pitch, i.e. 5 slots, 2) the full-pitch, i.e. 6 slots, or 3) the long-pitch, i.e. 7 slots. For instance, the span between the conductor segments from S29 to S24 is 5 slots, the span between the conductor segments from S47 to S41 is 6 slots, while the span between the conductor segments from S6 to S47 is 7 slots. Similarly, in W2' branch, the layer span between two adjacent conductor segments is also restrained to one layer.

Putting W2 and W2' branches together, it can be observed that the two winding directions are opposite. Specifically, if one is wound clockwise around the circumference of the stator 1, then the other one is counterclockwise. This symmetrical design aims to eliminate circulating current.

The winding patterns of the W1 and W1' branches are also illustrated in FIG. 3. Similarly, the coil span of the two adjacent conductor segments in W1 and W1' branches is also selected from the full-pitch, the short-pitch and the long-pitch. In terms of layer, the distance of the two adjacent conductor segments is also limited to one layer.

Specifically, the W1 branch starts at the L1 of the S5 slot, S5L1 (i.e. marked as W1 in FIG. 3), and ends up in the L8 of the S48, S48L8 (i.e. marked as W1o in FIG. 3). The entire winding pattern of W1 branch is as follows:

S5L1 - S11L2 - S17L1 - S23L2 - S30L1 - S36L2 - S42L1 - S48L2 -
S5L3 - S11L4 - S17L3 - S23L4 - S30L3 - S36L4 - S42L3 - S48L4 -
S5L5 - S11L6 - S17L5 - S23L6 - S30L5 - S36L6 - S42L5 - S48L6 -
S5L7 - S11L8 - S17L7 - S23L8 - S30L7 - S36L8 - S42L7 - S48L8

In term of W1' branch, the lead segment occupies the L8 of the S5, S5L8, (i.e. marked as W1' in FIG. 3), and end ups in the L1 of the S11, S11L1 (i.e. marked as W1'o in FIG. 3). The whole picture of the winding pattern of W1' is:

S5L8 - S48L7 - S42L8 - S36L7 - S30L8 - S23L7 - S17L8 - S11L7 -
S5L6 - S48L5 - S42L6 - S36L5 - S30L6 - S23L5 - S17L6 - S11L5 -
S5L4 - S48L3 - S42L4 - S36L3 - S30L4 - S23L3 - S17L4 - S11L3 -
S5L2 - S48L1 - S42L2 - S36L1 - S30L2 - S23L1 - S17L2 - S11L1

Similarly, if one branch is wound clockwise around the circumference of the stator 1, the other is counterclockwise.

The winding arrangement of the present disclosure is further shown in FIG. 4. Although only W1 and W2 branches of U-phase are depicted, by reference to the patterns, a POSITA should be able to understand the concept of the winding arrangement disclosed in the present disclosure.

As demonstrated in FIG. 4, the W1 and W2 branches of U-phase are implemented by continuous wave windings. The references S1-S48 represent the 48 slots of the stator 1. The marks L1-L4 in the first row represent the first four layers of a given 10; and the marks of L5-L8 in the second row represent the other four layers of the given slot 10.

As shown, the winding of the W1 branch begins at S5L1, i.e. the lead segment marked as W1, passes through the designated layers of the designated slots in accordance with the winding pattern discussed above, and finishes at S48L8, i.e. the end segment marked as W1o. Similarly, the winding of the W2 branch starts at S6L1, i.e. the lead segment marked as W2, passes through the designated layers of the designated slots in accordance with the winding pattern discussed previously, and reaches at S47L8, i.e. the end segment marked as W2o.

It can be seen in FIG. 3, as far as a pair of branches (e.g. the W2-W2' pair, and the W1-W1' pair) is concerned, their lead segments are in the same slot but different layers. In the present example, W2 starts at the first layer of the sixth slot (i.e. S6L1), while W2' starts at the eighth layer of the sixth slot (i.e. S6L8). The same arrangement is applied to the W1-W1' pair. Although the paired branches always occupy the same slots, it should be note that their end segments are in different slots.

In the present disclosure, to achieve a symmetrical and balanced winding arrangement, the winding patterns for U-phase, V-phase and W-phase are identical except that different slots are occupied. As previously discussion, following the same example, the number of slots per pole per phase is 2. On this basis, the windings patterns of V-phase and W-phase can be derived. Specifically, the winding patterns of V-phase are formed by right-shifting the winding set of U-phase by two slots. That is, the W2 branch of V-phase starts at S8L1 while ends up in S1L8; the W2' branch begins at S8L8 and ends up in S14L1; the W1 branch starts at S7L1 and ends up in S2L8; and the W1' branch begins at S7L8 while ends up in S13L1. Analogically, the winding patterns of W-phase its derived by further right-shifting the winding set of V-phase by two slots. In other words, the W2 branch of W-phase starts at S10L1 while ends up in S3L8; the W2' branch starts at S10L8 and ends up in S16L1; the W1 branch starts at S9L1 and ends up in S4L8; and the W1' branch starts at S9L8 while ends up in S15L1.

To sum up, U-phase occupies the entire eight layers of S5, S6, S11, S12, S17, S18, S23, S24, S29, S30, S35, S36, S41, S42, S47, and S48. Moreover, V-phase takes the entire eight layers of the S7, S8, S13, S14, S19, S20, S25, S26, S31, S32, S37, S38, S43, S44, S1, and S2. W-phase uses the entire eight layers of the S9, S10, S15, S16, S21, S22, S27, S28, S33, S34, S39, S40, S45, S46, S3, and S4.

Regardless which phase, the coil span of two adjacent conductor segments in any given branch is either of: 1) 6 slots, i.e. the full-pith, 2) 5 slots, i.e. the short-pitch, or 3) 7 slots, i.e. the long-pitch. The selection of coil span is made purposively in the instant disclosure by considering the phase difference among the poles to ensure the overall windings are evenly and symmetrically arranged.

Taking the four branches W1, W1', W2, W2' of U-shape as example. As can be observed in FIG. 3, for the first half of the slots (e.g. L1 to L24), the slots that W1 and W1' branches take are followed by the slots that W2 and W2' take. Particularly, the W1 and W1' branches take S5, S11, S17 and S23, while the W2 and W2' branches occupy the S6, S12, S18 and S24. The sequence swaps in the second half of the slots (e.g. L25 to L48). That is, the W2 and W2' branches take the lead in the second half. Specifically, the W2 and W2' branches take S29, S35, S41 and S47, while the W1 and W1' branches use S30, S36, S42 and S48. As it appears, by reference to FIG. 1, the positions of S30, S36, S42 and S48 taken by W1 and W1' branches in the second half are respectively diagonal to the positions of S6, S12, S18 and S24 occupied by W2 and W2' branches in the first half. Similarly, the positions of S29, S35, S41 and S47 taken by W2 and W2' branches in the second half are respectively diagonal to the positions of S5, S11, S17 and S23 occupied by W1 and W1' branches in the first half. The same patterns can also be seen in the branches of V-phase and W-phase. Thus, in the instant disclosure, the coil spans (i.e. 5, 6 or 7 slots) in a given branch are properly chosen to fulfill the object.

In terms of layer selections, in the present disclosure, the layer span between two adjacent conductor segments in a given branch of any given phase is restrain to one layer. This arrangement avoids flat or rectangular wires from being cracked because of bending, while also maintain the insulation ability.

The winding arrangement of the instant design is further symmetric and balanced because, as can be seen, each branch per phase occupies the same number of a given layer. Taking U-phase as example, each of the conductors occupies four L1 of the designated slots. Specifically, the W2 branch occupies the L1 layers of S6, S18, S29 and S41; the W2' branch takes the L1 layers of S12, S24, S35 and S47. Analogically, the W1 branch takes the L1 layers of S5, S17, S30 and S42; while the W1' branch occupies the L1 layers of S11, S23, S36 and S48. The symmetrical design effectively eliminates circulating current.

For manufacturing perspectives, in one embodiment, the wound-windings of the branches may be formed first and then radially inserted into the designated slots of the stator in accordance with the winding arrangement disclosed above.

In terms of welding, unlike the conventional hairpin windings which not only require numbers of differently-shaped conductors but also has numbers of connecting nodes to be welded, the winding arrangement of the present disclosure results in less connecting nodes. Specifically, in the embodiment of a three-phase electric machine having four branches per phase, there are at most 24 connection nodes, i.e. 3 phases*4 branches*2 terminals (i.e. one from the lead segment, the other from the end segment) per branch to be welded. The less number of connecting nodes not only reduces the wire damages, enhances the reliability, but also provide a more flexible way to connect the branches. It should be noted that the branches may be welded by using various of welding method. For example, it may be implemented by star-welding, delta-welding or any kind of welding alike.

Additionally, comparing to conventional winding structures, the instant design is more flexible. As mentioned, in the instant disclosure, a desired loop can be formed by welding the designated lead segment of one branch with the designated lead or end segment of another branch. For example, the four branches of U-phase may be welded in series (i.e. W1-W1o-W2-W2o-W1'-W1'o-W2-W2'o), and additionally, the W2'o of the U-phase, the W2'o of the V-phase and the W2'o of the W-phase are star-welded to form the desired loop. By the same manner, the two lead segments and the two end segments of any two branches may respectively be welded to form a parallel loop. That is, the instant design of winding arrangement makes it easy to accomplish a parallel connection of either a single-, two- or four-branch loop in a given phase.

It should also be noted that the way in which what branch should be connected to another will depend on the actual requirement and should not be considered as a limitation for the instant disclosure. Further, the number of stator slot, the number of layers per slot, the number of branches, the number of welding nodes, the number of phases, and the number of pole pairs may be varied depending on requirements, and therefore are not limited to those described in the present disclosure.

Even though preferred embodiments and advantages of the present disclosure have been described as above, it should be understood that the description does not limit the scope of the present disclosure. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three-phase electric machine, comprising:
a rotor having a plurality pair of poles;
a stator positioned around the rotor and having a plurality of slots with openings around an inner circumference of the stator and face to the rotor, wherein each of the slots defines an even number of layers; and
a plurality of conductors wound in the slots to form a plurality of branches per phase, comprising:
a first branch and a second branch, wherein the first branch and the second branch alternatively occupy the layers of a first subset of the slots;
a third branch and a fourth branch, wherein the third branch and the fourth branch alternatively occupy the layers of a second subset of the slots;
wherein the first subset and the second subset are adjoined to each other; and
wherein positions of the first subset in a first half of the slots are diagonal to positions of the second subset in a second half of the slots, and wherein positions of the second subset in the first half of the slots are diagonal to position of the first subset in the second half of the slots.

2. The three-phase electric machine of claim 1, wherein the first branch and the second branch evenly occupied a same number of any one of the layers in the first subset of the slots, and wherein the third branch and the fourth branch evenly occupy a same number of any one of the layers in the second subset of the slots.

3. The three-phase electric machine of claim 1, wherein a span between two adjacent slots with respect to either the first branch, the second branch, the third branch or the fourth branch is chosen from a full-pitch, a short-pitch, and a long-pitch.

4. The three-phase electric machine of claim 3, wherein the full-pitch equals to a pole-pitch of the electric machine, the short-pitch is the full-pitch minus one, and the long-pitch is the full-pitch plus one.

5. The three-phase electric machine of claim 1, wherein a layer span between two adjacent layer with respect to either the first branch, the second branch, the third branch or the fourth branch is one layer.

6. The three-phase electric machine of claim 1, wherein the first branch is wave-wound clockwise and the second branch is wave-wound counterclockwise into the first subset of the slots, and the third branch is wave-wound clockwise and the fourth branch is wave-wound counterclockwise into the second subset of the slots.

7. The three-phase electric machine of claim 1, wherein the first branch starts at a first layer and the second branch starts at a last layer of the first slot of the first subset of the slots, and wherein the third branch starts at a first layer and the fourth branch starts at a last layer of the first slot of the second subset of the slots.

8. The three-phase electric machine of claim 1, wherein the stator has forty-eight slots, the first subset comprise the fifth (S5), the eleventh (S11), the seventeenth (S17), the twenty-third (S23), the thirtieth (S30), the thirty-sixth (S36), the forty-second (S42), and the fourth-eighth (S48) slots, and the second subset comprises the sixth (S6), the twelfth (S12), the eighteenth (S18), the twenty-fourth (S24), the twenty-ninth (S29), the thirty-fifth (S35), the forty-first (S41), and the forty-seventh (S47) slots.

9. The three-phase electric machine of claim 8, further comprising another plurality of branches for another phase, wherein the another plurality of branches are from by right-shifting the first branch, the second branch, the third branch, and the fourth branch by two slots.

10. A winding arrangement provided on a stator having a plurality of slots, comprising:
a first winding and a second winding occupied a first subset of the plurality of slots; and
a third winding and a fourth winding occupied a second subset of the plurality of slots;
wherein the first subset and the second subset of the plurality of slots are adjoined to each other;
wherein a span between two adjacent slots concerning the first winding, the second winding, the third winding and the fourth winding is selected from a full-pitch, a short-pitch, and a long-pitch to result in the winding arrangement where the first subset in a first half of the slots is diagonal to the second subset in a second half of the slots, and the second subset in the first half of the slots is diagonal to the first subset in the second half of the slots.

11. The winding arrangement of claim 10, wherein the first subset is followed by the second subset for the first half of the plurality of slots, and the first subset follows the second subset for the second half of the plurality of slots.

12. The winding arrangement of claim 10, each of the plurality of slots defines an even number of layers, wherein the first winding and the second winding alternatively inserted into the layers of the first subset of the slots, and wherein the third winding and the fourth winding alternatively inserted into the layers of the second subset of the slots.

13. The winding arrangement of claim 12, wherein the first winding and the second winding evenly occupied a same number of any one of the layers in the first subset of the slots, and wherein the third winding and the fourth winding evenly occupy a same number of any one of the layers in the second subset of the slots.

14. The winding arrangement of claim 12, wherein the first winding is wave-wound clockwise and the second winding is wave-wound counterclockwise into the different layers of the first subset of the slots; wherein the third winding is wave-wound clockwise and the fourth winding is wave-wound counterclockwise into different layers of the second subset of the slots.

15. The winding arrangement of claim 14, wherein the first winding starts at a first layer and the second winding starts at a last layer of a first slot of the first subset of the slots; wherein the third winding starts at a first layer and the fourth winding starts at a last layer of a first slot of the second subset of the slots.

16. The winding arrangement of claim 12, wherein a layer span concerning either of the first winding, the second winding, the third winding, or the fourth winding is one layer.

17. The winding arrangement of claim 10, wherein the full-pitch equals to a number of the slots of the stator divided by a number of poles of a rotor, wherein the short-pitch is the full-pitch minus one, and the long-pitch is the full-pitch plus one.

18. The winding arrangement of claim 10, wherein the first winding, the second winding, the third winding and the fourth winding are wave-wound and radially inserted into the slots of the stator.

19. A stator assembly, comprising:
a stator having forty-eight slots, wherein each of the forty-eight slots defines an even number of layers; and
a winding arrangement provided on the stator, comprising:
a first winding set provided fora first phase, a second winding set provided for a second phase, and a third winding set provided for a third phase; and
wherein the first winding set occupies a first set of the slots, the second winding set occupies a second set of the slots, and the third winding set occupies a third set of the slots;
wherein each of the first winding set, the second winding set, and the third winding set comprises sixteen slots; and
wherein the first set, the second set and the third set are adjoined to one another,
wherein the first winding set comprises:
a first branch and a second branch, wherein the first branch and the second branch alternatively occupy the layers of a first subset of the slots;
a third branch and a fourth branch, wherein the third branch and the fourth branch alternatively occupy the layers of a second subset of the slots; and
wherein positions of the first subset in a first half of the slots are diagonal to positions of the second subset in a second half of the slots, and wherein positions of the second subset in the first half of the slots are diagonal to position of the first subset in the second half of the slots.

20. The stator assembly of claim 19, wherein the first set of the slots comprising the fifth (S5), the sixth (S6), the eleventh (S11), the twelfth (S12), the seventeenth (S17), the eighteenth (S18), the twenty-third (S23), the twenty-fourth (S24), the twenty-ninth (S29), the thirtieth (S30), the third-fifth (S35), the thirty-sixth (S36), the forty-first (S41), the forty-second (S42), the forty-seventh (S47), and the forty-eighth (S48) slots;

wherein the second set of the slots comprising the seventh (S7), the eighth (S8), the thirteenth (S13), the fourteenth (S14), the nineteenth (S19), the twentieth (S20), the twenty-fifth (S25), the twenty-sixth (S26), the thirty-first (S31), the thirty-second (S32), the thirty-seventh (S37), the thirty-eighth (S38), the forty-third (S43), the forty-fourth (S44) slots, the first (S1), and the second (S2); and wherein the third set of the slots comprising the ninth (S9), the tenth (S10), the fifteenth (S15), the sixteenth (S16), the twenty-first (S21), the twenty-second (S22), the twenty-seventh (S27), the twenty-eighth (S28), the thirty-third (S33), the thirty-fourth (S34), the thirty-ninth (S39), the fortieth (S40), the forty-fifth (S45), and the forth-sixth (S46), the third (S3), and the fourth (S4) slots.

21. The stator assembly of claim 20, wherein each of the forty-eight slots defines eight layers numerically indexed from an inner circumference of the stator assembly outward are respectively L8, L7, L6, L5, L4, L3, L2, and L1.

22. The stator assembly of claim 21, the first winding set further comprising:
a first branch radially and sequentially inserts into S5L1, S11L2, S17L1, S23L2, S30L1, S36L2, S42L1, S48L2, S5L3, S11L4, S17L3, S23L4, S30L3, S36L4, S42L3, S48L4, S5L5, S11L6, S17L5, S23L6, S30L5, S36L6, S42L5, S48L6, S5L7, S11L8, S17L7, S23L8, S30L7, S36L8, S42L7, and S48L8;
a second branch radially and sequentially inserts into S5L8, S48L7, S42L8, S36L7, S30L8, S23L7, S17L8, S11L7, S5L6, S48L5, S42L6, S36L5, S30L6, S23L5, S17L6, S11L5, S5L4, S48L3, S42L4, S36L3, S30L4, S23L3, S17L4, S11L3, S5L2, S48L1, S42L2, S36L1, S30L2, S23L1, S17L2, and S11L1;
a third branch radially and sequentially inserts into S6L1, S12L2, S18L1, S24L2, S29L1, S35L2, S41L1, S47L2, S6L3, S12L4, S18L3, S24L4, S29L3, S35L4, S41L3, S47L4, S6L5, S12L6, S18L5, S24L6, S29L5, S35L6, S41L5, S47L6, S6L7, S12L8, S18L7, S24L8, S29L7, S35L8, S41L7, and S47L8; and
a fourth branch radially and sequentially inserts into S6L8, S47L7, S41L8, S35L7, S29L8, S24L7, S18L8, S12L7, S6L6, S47L5, S41L6, S35L5, S29L6, S24L5, S18L6, S12L5, S6L4, S47L3, S41L4, S35L3, S29L4, S24L3, S18L4, S12L3, S6L2, S47L1, S41L2, S35L1, S29L2, S24L1, S18L2, and S12L1.

23. The stator assembly of claim 22, the second winding set further comprising:
a first branch having a winding pattern by right-shifting the first branch of the first winding set by two slots;
a second branch having a winding pattern by right-shifting the second branch of the first winding set by two slots;
a third branch having a winding pattern by right-shifting the third branch of the first winding set by two slots; and
a fourth branch having a winding pattern by right-shifting the fourth branch of the first winding set by two slots.

24. The stator assembly of claim 23, the third winding set further comprising:
a first branch having a winding pattern by right-shifting the first branch of the second winding set by two slots;
a second branch having a winding pattern by right-shifting the second branch of the second winding set by two slots;
a third branch having a winding pattern by right-shifting the third branch of the second winding set by two slots; and
a fourth branch having a winding pattern by right-shifting the fourth branch of the second winding set by two slots.

* * * * *